Dec. 11, 1923.

E. LETSCH 1,476,896

FLUID PRESSURE GAUGE

Filed June 29, 1921

INVENTOR
Eugene Letsch
BY
Howard P. Denison
ATTORNEYS

Patented Dec. 11, 1923.

1,476,896

UNITED STATES PATENT OFFICE.

EUGENE LETSCH, OF LYNBROOK, NEW YORK, ASSIGNOR TO PIERCE, BUTLER & PIERCE MFG. CORP., OF SYRACUSE, NEW YORK, A CORPORATION OF NEW YORK.

FLUID-PRESSURE GAUGE.

Application filed June 29, 1921. Serial No. 481,246.

*To all whom it may concern:*

Be it known that I, EUGENE LETSCH, of Lynbrook, in the county of Nassau in the State of New York, have invented new and useful Improvements in Fluid-Pressure Gauges, of which the following, taken in connection with the accompanying drawings, is a full, clear, and exact description.

This invention relates to a fluid pressure gauge in which a pressure actuated tube of the Bourdon type is employed in the operation of an index finger or pointer around a graduated dial calibrated to indicate the pressure in the tube.

The fluid under pressure whether liquid or gaseous may be used for many different purposes but in almost all instances is utilized within certain limits or range of pressure with more or less frequent fluctuations above the normal range, and the main object of my present invention is to provide simple and efficient means for registering the normal pressures most commonly used over a relatively wide field or relatively long arc upon the dial and for registering the abnormal or reserve pressures through a relatively narrow field or short arc of the dial, thereby permitting a relatively wide spacing and clear reading of the pressure unit indices under normal working pressures and a relatively short spacing of the pressure indices embracing a considerable number of the pressure units.

In other words, I have sought to cause the movement of the index finger or pointer through a relatively long arc for normal working pressures and through a relatively short arc for extra or reserve pressures whereby to enable the attendant to obtain clear and accurate readings of the lower unit working pressures and approximate readings of the higher pressures.

Other objects and uses relating to specific parts of the device will be brought out in the following description:

Figure 1:
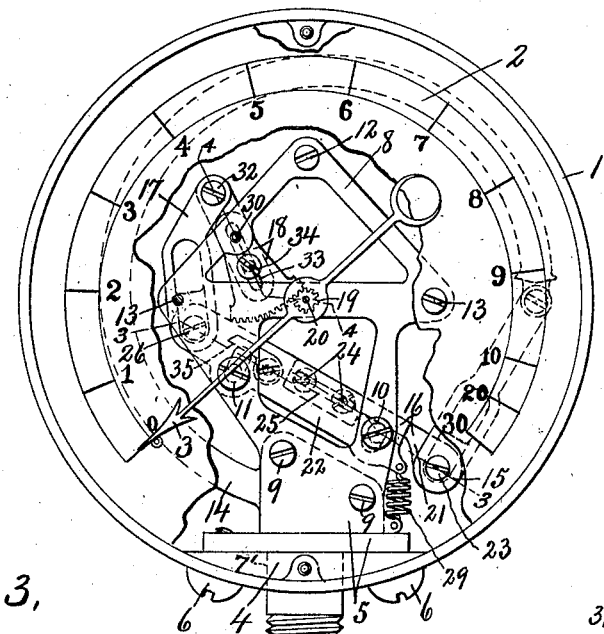
Fig. 1 is a face view partly broken away of a pressure gauge embodying the various features of my invention.
Figure 3:
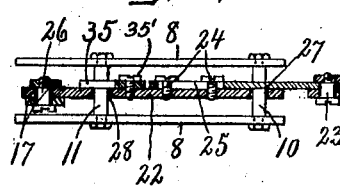

Figs. 3 and 4 are detailed sectional views taken, respectively, on lines 3—3 and 4—4, Fig. 1.

As illustrated, the pressure gauge comprises a cylindrical case or housing —1—, a circular dial plate —2—, an index finger or pointer —3—, a dial supporting frame and means for moving the pointer around the dial as hereinafter more fully described.

The case or housing —1— is provided at its lower side with a segmental platform —4— for receiving and supporting the inner frame and mechanism carried thereby, and is preferably open at the front side for receiving the dial plate —2— which is preferably secured to the frame independently of the casing to enable the working parts to be properly adjusted before being installed in the case or housing.

The frame preferably comprises a supporting base —5— secured by screws —6— to the platform —4— and adjacent side of the case and is provided with a tubular extension —7— projecting through a radial opening —7'— in said platform and case to the exterior thereof and having its outer end threaded for securement to a conduit or other part of the fluid pressure system.

A pair of similar upright plates 8—8 are secured at their lower ends by screws —9— to the front and rear faces of the base —5— and extend upwardly therefrom in substantially parallel planes and are additionally held in fixed spaced relation by transverse tie rods or posts —10—, —11— and —12—, the posts —10— and —11— being located near the base —5—, while the post —12— is located near the upper ends of the plates —8— some distance above the posts —10— and —11—.

The dial plate —2— is secured by screws —13— to the front face of the front plate —8— and is provided with a central aperture through which the adjacent end of the pointer supporting spindle projects to allow said pointer to be secured to the outer end thereof to move around the front face of the dial so that the several adjustments of the pointer operating means may be more conveniently made before the frame with the pointer operating mechanism thereon are installed in the case.

*Pointer-Operating-Mechanism.*

A Bourdon tube —14— is secured at one end to one side of the base —5— for communication with the pressure system through the passage-way in the extension —7—, the other end of said tube being closed and pivotally connected by a link —15— to one end of a sectional lever —16— having a plurality of, in this instance two, fulcrums upon the upwardly extending plates —8— and its other end pivotally connected by a link —17— to a sectional toothed segment —18— meshing with a pinion —19—, the latter being secured to a spindle —20— having its ends journaled in the plates —8— for receiving and supporting the pointer —3— on the front end thereof.

The lever —16— is composed of sections —21— and —22—, Fig. 3, the section —21— being connected by pivotal screw —23— to one end of the link —15— and has its opposite end adjustable lengthwise of and upon the section —22— and held in place by clamping screws —24— which are passed through a lengthwise slot —25— in the section —21— and engaged in threaded apertures in the section —22—, thus permitting the lengthening or shortening of the leverage connection with the free end of the tube —14— as may be necessary to conform to different coefficients of travel of different tubes owing to their variations in resiliency.

Figure 2:
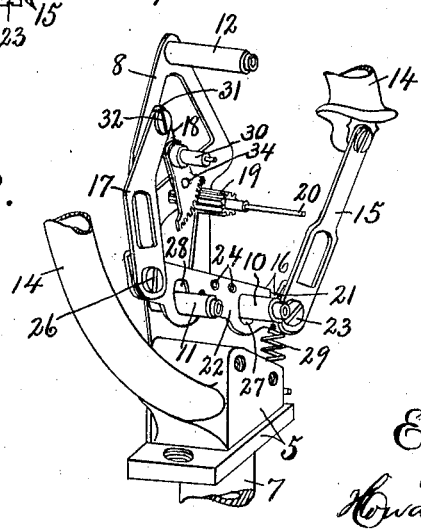
Fig. 2 is a perspective view of the interior mechanism of the gauge omitting the case and dial and portions of the expansion tube.

The lever section —22— is pivoted at —26— to one end of the link —17— and has its remaining portion extending toward the pivot —23— and provided with transversely elongated slots —27— and —28—, Figure 2, in longitudinally spaced relation between the pivots —23— and —26— for receiving the fulcrum studs or posts —10— and —11—, respectively, the other end of said lever section —22— being connected by retracting spring —29— to the adjacent portion of the base —5— for normally holding the upper wall of the slot —27— in contact with the adjacent fulcrum stud —10— and simultaneously holding the lower wall of the slot —28— in engagement with the fulcrum pin or stud —11—.

The toothed segment —18— is pivoted at —30— to the upright plates —8— and is provided with a longitudinally adjustable extension —31— having its upper end pivotally connected by a screw —32— to the link —17— and its other end provided with a lengthwise slot —33— for receiving the pivotal pin —30— and a clamping screw —34—, the latter serving to hold the extension —31— in its adjusted position.

The object of this last named adjustment is to enable the pointer to travel through its maximum range of movement around the dial to properly register with the indices thereon according to the pressure. A suitable bearing member —35—. Figures 1 and 3 is pivotally mounted upon the lever section —22— to extend across the upper end wall of the slot —28— to form a fulcrum bearing on the stud —11— and is adjustable lengthwise of said slot or transversely of the lever section —22— to cooperate with the adjustment of the lever sections —21— and —22— in changing the leverage of the lever —16— at the critical moment, or at the end of the longer range of movement of the pointer to cause the latter to change its angle of movement through a considerably shorter range, for the same or greater movement of the free end of the Bourdon tube.

As illustrated, the maximum range of movement of the pointer is through an arc considerably greater than half a circle, as indicated upon the dial, which is graduated along said arc by a series of, in this instance, eleven transverse division lines in substantially uniform spaced relation, ten of which are numbered in sequence from zero to ten, representing units of pressure as pounds per square inch, and represent the normal, or usual working pressure, while the remaining space is sub-divided by a medial line and represents the abnormal, or relatively high reserve pressure of, in this instance, from ten to thirty pounds per square inch, or other units of pressure.

When the various parts are properly adjusted, the position of the fulcrum pins —10— and —11—, relatively to each other, and to the pivotal pins —23— and —26—, is such that a certain amount of movement of the tube —14— from its normal position of rest, will cause the rotation of the pointer —3— from its zero position through substantially ten-elevenths of its maximum arc of movement about the axis of the fulcrum pin —10—, at which time, if the pressure continues to increase, the fulcrum of the lever —16— will be automatically shifted from the pin —10— to the pin —11—, the pull of the spring —29— being overcome by the increased force which is exerted by the tube —14— and an increase of the distance, or three times the pressure required to produce that movement of the pointer, will cause said pointer to move only one-eleventh or through the remaining portion of said arc of maximum movement of the pointer.

That is, the spring —29— normally holds the lever —16— in engagement with the fulcrum pin —10— a relatively short distance from its connection with the free end of the tube —14— and maintains this position during the relatively low pressure of, in this instance, from zero to ten pounds per square inch, during which the longer arm of the lever connected to the toothed segment —18— will, of course, move in a relatively longer arc than the first named end as connected with the tube, and will cause the pointer to move in a corresponding arc, of in this instance from zero to ten, it being understood that the slot —28— is of sufficient length to permit that movement, and that the adjustable bearing member —35— is adjusted by hand and clamped in its adjusted position by a pivotal bolt —35'— to engage the fulcrum pin —11— at the end of such movement, thereby limiting the first named movement of the lever upon the fulcrum —10— in case the pressure in the tube should continue to increase, in which case, it is obvious that the lever would then swing upon the fulcrum —11— which is a relatively short distance from the pivotal connection of said lever with the link —17—.

This shifting of the fulcrum of the lever —16— from the pin —10— to the pin —11— allows the end of the lever connected to the tube —14— to move through a longer arc than its opposite end to correspond to the increased movement of the tube due to the increased pressure therein, while the shorter arm of the lever from the fulcrum —11— to the connection with the toothed segment —18— moves through a relatively short arc, and produces a correspondingly short arc of movement of the pointer —3— to indicate the relatively high or reserve pressure, until limited by the lower wall of the slot —27— engaging the fulcrum —10—, this latter slot being of sufficient length to permit the movement of the pointer through the maximum range of the gauge.

As the pressure in the tube is reduced below the highest point of the working range, in this instance, ten pounds per square inch, the fulcrum of the lever —16— is restored from the fulcrum pin —11— to the fulcrum pin —10— by means of a spring —29—, which also serves to return the lever and pointer, together with the intermediate connection, to their normal, or starting position, when the pressure is reduced to a minimum, or to the zero graduation.

I claim:

1. In a fluid pressure gauge, means actuated by the fluid pressure for indicating variations in said pressure, including a lever having different fulcrums and means whereby it is actuated on one fulcrum by pressure within a certain range, and on another fulcrum by pressures above that range.

2. In a fluid pressure gauge, a lever, separate fulcrums for said lever, means actuated by fluid pressure within a certain range for rocking the lever about one fulcrum and about the other fulcrum when the pressure exceeds that range.

3. In a fluid pressure gauge, a lever, separate fulcrums for said lever, means actuated by fluid pressure within a certain range for rocking the lever about one fulcrum and about the other fulcrum when the pressure exceeds that range, said lever having one of its fulcrum-bearings adjustable to vary the period of engagement with that fulcrum.

4. In a fluid pressure gauge means actuated by the fluid pressure for indicating variations in said pressure, including a lever having different fulcrums and means whereby it is actuated on one fulcrum by pressure within a certain range and on another fulcrum by pressure above that range, said lever having a longitudinally adjustable section for varying its arc of movement.

5. In a fluid pressure gauge, a dial, a pointer movable around the dial, a lever movable about a fulcrum and having an independent movement transversely thereof, pressure-operated means for rocking said lever, means for transmitting motion from the lever to the pointer, and a stop for limiting the movement of the lever on said fulcrum and forming another fulcrum on which the lever may rock transversely of the first named fulcrum.

In witness whereof I have hereunto set my hand this 16th day of June 1921.

EUGENE LETSCH.

Witnesses:
W. E. GILLEN,
FRED O. PURDY.